United States Patent
Hoang et al.

(10) Patent No.: US 9,740,017 B2
(45) Date of Patent: Aug. 22, 2017

(54) OPTICAL POLARISATION DEVICE FOR A STEREOSCOPIC IMAGE PROJECTOR

(71) Applicant: VOLFONI R&D, Paris (FR)

(72) Inventors: Minh Hoang, Neuilly-Plaisance (FR); Christophe Brossier, Paris (FR); Bertrand Caillaud, Saint Laurent du Var (FR); Simon-Pierre Delord, Villeneuve-Loubet (FR)

(73) Assignee: VOLFONI R&D, Paris (FR)

( * ) Notice: Subject to any disclaimer, the term of this patent is extended or adjusted under 35 U.S.C. 154(b) by 0 days.

(21) Appl. No.: 14/894,393

(22) PCT Filed: May 27, 2014

(86) PCT No.: PCT/EP2014/061002
§ 371 (c)(1),
(2) Date: Nov. 27, 2015

(87) PCT Pub. No.: WO2014/191439
PCT Pub. Date: Dec. 4, 2014

(65) Prior Publication Data
US 2016/0124238 A1   May 5, 2016

(30) Foreign Application Priority Data

May 29, 2013  (FR) ..................................... 13 54854
Jan. 14, 2014  (FR) ..................................... 14 50285

(51) Int. Cl.
*G02B 27/26*  (2006.01)
*G02B 13/02*  (2006.01)
(Continued)

(52) U.S. Cl.
CPC ............. *G02B 27/26* (2013.01); *G02B 13/02* (2013.01); *G02B 13/16* (2013.01);
(Continued)

(58) Field of Classification Search
CPC ...... G03B 21/28; G02B 7/198; G02B 7/1822; G02B 7/1825; G02B 26/0825; F24J 2/10; F24J 2/12; F24J 2002/1004
(Continued)

(56) References Cited

U.S. PATENT DOCUMENTS 5,993,004 A * 11/1999 Moseley ................ G02B 27/26
                                                          348/E13.03
7,857,455 B2   12/2010 Cowan et al.
(Continued)

FOREIGN PATENT DOCUMENTS

FR          2 978 564          2/2013

OTHER PUBLICATIONS

International Search Report issued Jul. 28, 2014 in PCT/EP2014/061002 filed May 27, 2014.

*Primary Examiner* — Christina Riddle
*Assistant Examiner* — Christopher Lamb, II
(74) *Attorney, Agent, or Firm* — Oblon, McClelland, Maier & Neustadt, L.L.P.

(57) ABSTRACT

An optical polarization device for a stereoscopic image projector, including: a polarizer optical element including two beam splitter-polarizer plates, joined to one another; first and second optical reflectors configured to modify, respectively, a trajectory of first and second light beams reflected such that the reflected and transmitted light beams are projected to form one and same stereoscopic image; first, second, and third polarization modulators configured to selectively switch the optical polarization, respectively, of a transmitted light beam, of the first and of the second reflected light beams, between the first and second states of optical polarization; and a control circuit for the polarization modulators.

15 Claims, 5 Drawing Sheets

(51) Int. Cl.

| | |
|---|---|
| *G02B 13/16* | (2006.01) |
| *G02B 26/08* | (2006.01) |
| *G02B 27/22* | (2006.01) |
| *G02B 27/28* | (2006.01) |
| *G02F 1/01* | (2006.01) |
| *G03B 21/16* | (2006.01) |
| *G03B 21/28* | (2006.01) |
| *G03B 35/26* | (2006.01) |
| *H04N 13/04* | (2006.01) |

(52) U.S. Cl.
CPC ..... *G02B 26/0825* (2013.01); *G02B 27/2264* (2013.01); *G02B 27/283* (2013.01); *G02F 1/0136* (2013.01); *G03B 21/16* (2013.01); *G03B 21/28* (2013.01); *G03B 35/26* (2013.01); *H04N 13/0438* (2013.01); *H04N 13/0459* (2013.01)

(58) Field of Classification Search
USPC ............................... 359/874, 847, 849; 353/8
See application file for complete search history.

(56) References Cited

U.S. PATENT DOCUMENTS

| | | | |
|---|---|---|---|
| 2005/0063077 A1* | 3/2005 | Martinez | G02B 7/182 359/847 |
| 2005/0162762 A1* | 7/2005 | Novak | G02B 26/06 359/849 |
| 2007/0058137 A1* | 3/2007 | Yang | G03B 21/26 353/52 |
| 2008/0143965 A1* | 6/2008 | Cowan | G02B 27/26 353/8 |
| 2008/0284986 A1* | 11/2008 | Tachibana | G03B 21/28 353/69 |
| 2010/0182571 A1 | 7/2010 | Nishikawa et al. | |
| 2011/0032483 A1* | 2/2011 | Hruska | G02B 26/008 353/8 |
| 2011/0096295 A1 | 4/2011 | Cowan et al. | |
| 2012/0133893 A1* | 5/2012 | Choi | G03B 35/26 353/8 |
| 2012/0182484 A1* | 7/2012 | Imai | G03B 21/2033 348/744 |
| 2014/0218648 A1 | 8/2014 | Palmer | |
| 2015/0103318 A1* | 4/2015 | Lee | G02B 27/2264 353/8 |

* cited by examiner

Fig. 5
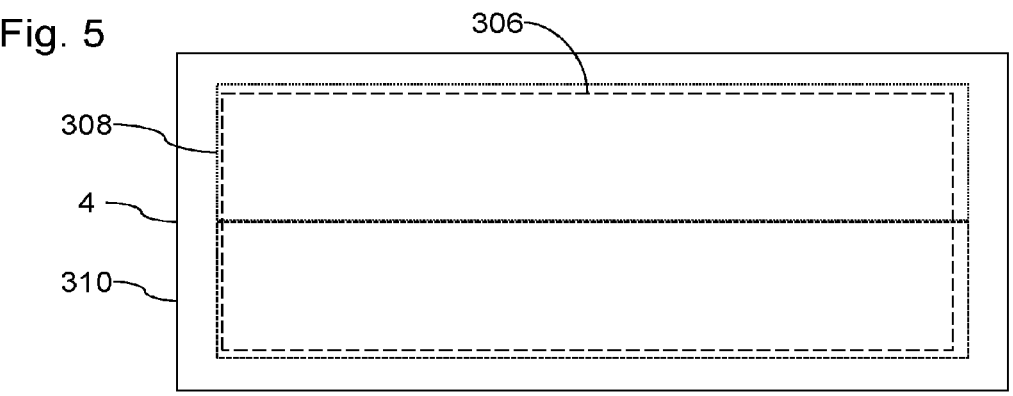
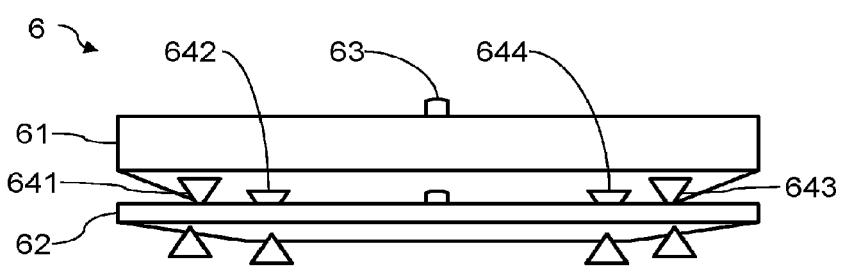
Fig. 6
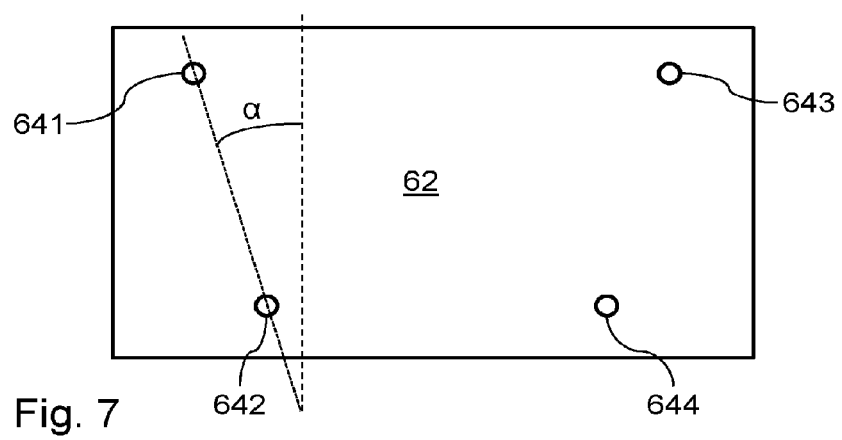
Fig. 7

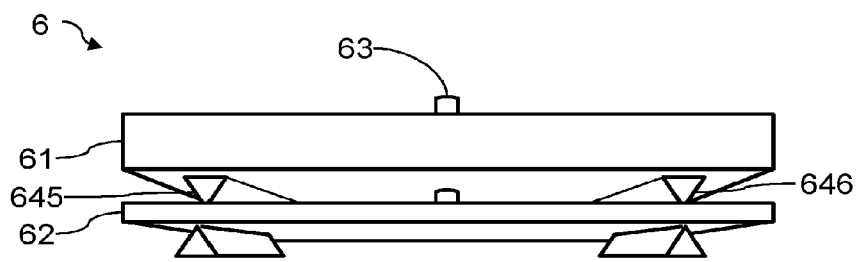
Fig. 8
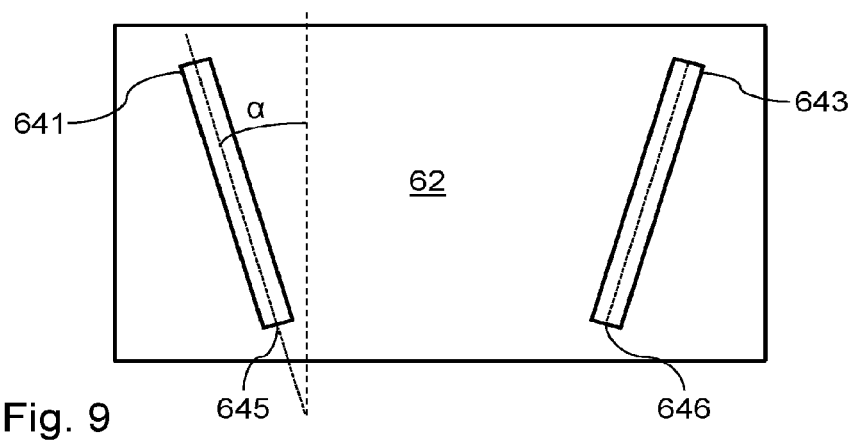
Fig. 9
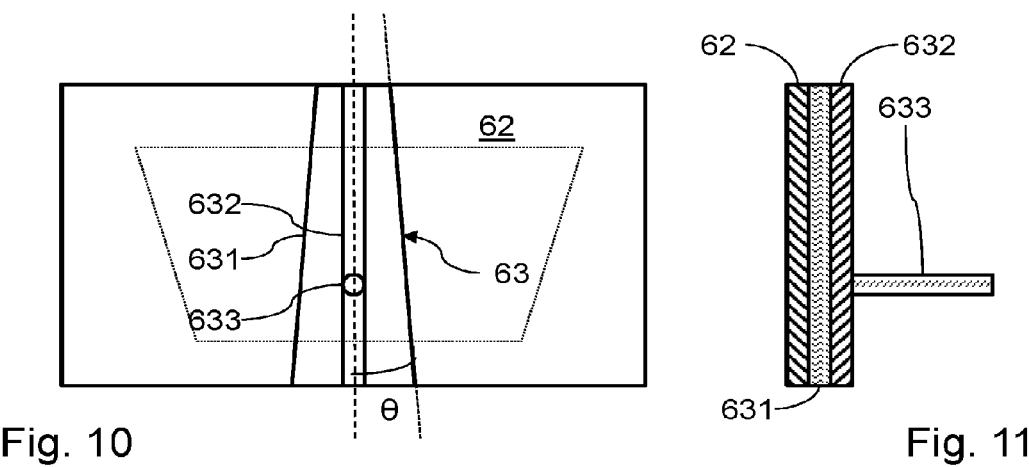
Fig. 10
Fig. 11

OPTICAL POLARISATION DEVICE FOR A STEREOSCOPIC IMAGE PROJECTOR

The invention relates to an optical polarization device for a stereoscopic image projector. The invention also relates to a system for displaying stereoscopic images and a method of displaying stereoscopic images.

In a known manner, the projection of stereoscopic images generally uses the alternating projection, on a screen, of two sub-sequences of temporally multiplexed stereoscopic images. One of these sub-sequences of images is intended to be seen by a left eye of a viewer, while the other sub-sequence of images is intended to be seen by the right eye of the viewer, thus creating an impression of relief for the viewer. The viewer is typically furnished with stereoscopic spectacles configured to allow each eye of the viewer to see only the sub-sequence of images which is intended for it. In particular, display systems with passive stereoscopic spectacles are known. In such systems, distinct optical polarization states are applied to the two sub-sequences of images; the stereoscopic spectacles comprise, opposite each eye, a polarizer filter configured to transmit solely the sub-sequence intended for this eye.

A known drawback of this technique is that the stereoscopic images are displayed with reduced brightness, since the optical transmission of the polarizer is at most equal to 50%. Reduced brightness is detrimental to the viewing comfort of viewers, and makes it necessary, in order to remedy same, to resort to projectors of high luminous power, so giving rise to excess heating and electrical consumption.

U.S. Pat. No. 7,857,455 B2 describes an optical polarization device recombining two images on a screen. These two images arise from two beams having different optical paths and having as origin one and the same light beam emitted by a projector. This device comprises:

- a beam splitter-polarizer able to decompose an incident light beam, into a transmitted light beam exhibiting a first optical polarization state, and a reflected light beam exhibiting a second optical polarization state distinct from the first optical polarization state;
- an optical reflector configured to modify the trajectory of the reflected light beam in such a way that the said reflected and transmitted light beams are able to be projected so as to form one and the same stereoscopic image;
- first and second polarization modulators respectively able to switch the optical polarization of the transmitted and reflected light beams, between the first and second optical polarization states in such a way that the said reflected and transmitted light beams all exhibit one and the same optical polarization state.

However, this device exhibits numerous drawbacks, such as significant bulkiness or else being complex to produce, giving rise to high cost. Indeed, the rapid magnification of the width of the beam, combined with the successive rebounding of this beam, initially as a first reflection on the beam splitter-polarizer and then as a second reflection on the reflector, compels the use of optic components of significant magnification, in particular for the reflector, thereby escalating the cost and the bulkiness of the device. Furthermore, the splitter-polarizer must be placed at a significant distance from the projector in order to operate correctly, thereby involving a significant bulkiness of the splitter-polarizer to intersect the incident beam. Furthermore, the difference in path length between the primary beam passing through the splitter-polarizer and the secondary beam reflected firstly on the beam splitter-polarizer and then on the reflector is non-negligible, leading to an appreciable difference in size between the image resulting from the primary beam and the image resulting from the secondary beam.

There therefore exists a need for an optical polarizer for a stereoscopic image projector guaranteeing one and the same image size for the primary and secondary beams, while avoiding the use of expensive, bulky optics which degrade the quality of the image and while preserving high brightness.

Moreover, by its small size and its reduced weight, this system will be able to be installed in configurations that are becoming ever more widespread on the market, such as "boothless", where the room is greatly reduced as compared with a traditional projection booth.

The invention thus pertains to an optical polarization device for a stereoscopic image projector, as defined in the annexed claims. The invention furthermore pertains to a system for displaying stereoscopic images, as defined in the annexed claims. The invention moreover pertains to a method for displaying stereoscopic images, as defined in the annexed claims.

Other characteristics and advantages of the invention will emerge clearly from the description given hereinafter, by way of wholly non limiting indication, with reference to the appended drawings, in which:

FIG. 5 is a schematic illustration of the beams projected onto a screen by the display system of FIG. 1;

FIGS. 6 and 7 are respectively side and end-on views of a mirror furnished with a deformation mechanism according to a first variant;

FIGS. 8 and 9 are respectively side and end-on views of a mirror furnished with a deformation mechanism according to a second variant;

FIGS. 10 and 11 are views from beneath and side views of a mirror and of a deformation actuator;

The invention proposes an optical polarization device for the projection of stereoscopic images comprising in particular a polarizer optical element formed of two splitter-polarizer plates joined together. This polarizer optical element is in particular configured to split an incident light beam emitted by a stereoscopic image projector into two reflected light beams and a transmitted light beam, the transmitted and reflected light beams exhibiting different polarizations.

By splitting the incident light beam into reflected and transmitted light beams exhibiting different polarizations, the polarization modulation can be applied just to the reflected beams or to the transmitted beam, thereby reducing the total losses of luminous intensity with respect to the case where this polarization is applied to the whole of the incident light beam. Furthermore, by splitting the incident beam into two reflected beams and a transmitted beam, rather than only into a reflected beam and a transmitted beam, the optical reflector of large dimensions is removed and replaced with two optical reflectors of lower dimensions, thereby reducing the bulkiness of the device, in contradistinction to a technical a priori.

Finally, the inventors have noted that the fact of placing the join of the splitter-polarizer plates on the trajectory of the incident beam, not only does not cause the appearance of an optical artefact (such as a dark bar) on the stereoscopic images but makes it possible to reduce the minimum distance between the optical output of the stereoscopic image projector and the optical polarization element, thereby greatly helping to reduce the bulkiness of the device.

The trajectory of a reflected light beam can be modified by an optical reflector, in such a way that this reflected light beam and the transmitted light beam are projected to form one and the same stereoscopic image. The optical reflectors can for this purpose be furnished with deformation devices.

Hereinafter in this description, characteristics and functions that are well known to the person skilled in the art are not described in detail.

Figure 1:
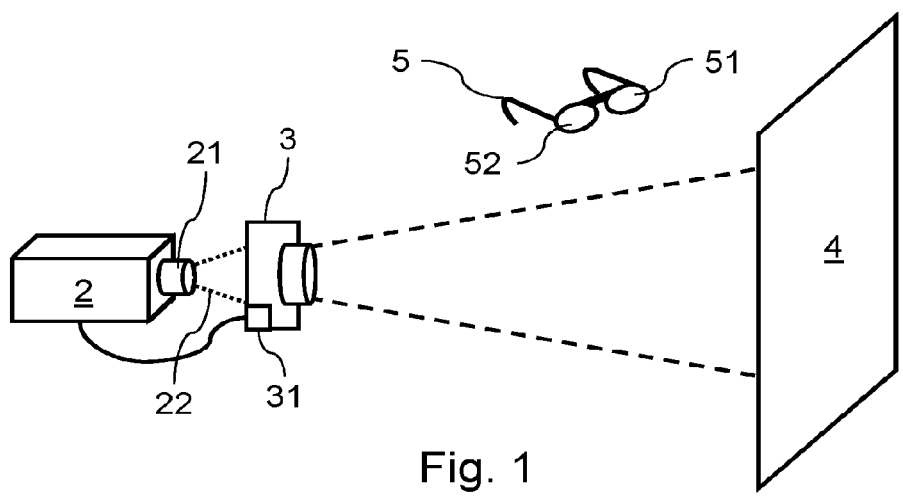
FIG. 1 is a schematic side view of a system for displaying stereoscopic images according to an example of an embodiment of the invention.

FIG. 1 represents an assembly for the display of stereoscopic images. This assembly comprises here:
a stereoscopic image projector 2;
an optical polarization device 3;
a polarization-preserving reflecting screen 4, and
a pair of passive stereoscopic spectacles 5.

The projector 2 is here a high-speed digital projector, able to project images with a frequency greater than or equal to 50 Hz and, preferably, greater than or equal to 144 Hz. This projector 2 is in particular able to produce a sequence of stereoscopic images comprising two temporally multiplexed sub-sequences of images intended respectively for the left and right eye of a viewer, and to project these images onto the screen 4. This projector 2 comprises an output objective 21 through which is able to be projected an incident light beam 22 (here of unpolarized light) produced by the projector 2 and comprising the stereoscopic images.

The device 3 is in particular configured to apply orthogonal optical polarizations to the sub-sequences of images intended to be projected onto the screen 4. The optical polarizations of the two sub-sequences of images are here mutually orthogonal linear polarizations. In this example, the following convention is chosen: the images intended for the left eye exhibit a linear P polarization and the images intended for the right eye exhibit a linear S polarization. For this purpose, the device 3 comprises in particular a control circuit 31 able to control the application of the polarizations of the light passing through it in response to a synchronization signal received by the projector 2. This synchronization signal makes it possible to synchronize the application of the polarizations with the switching between the sub-sequences of images emitted by the projector 2. For example, this circuit 31 is linked, by means of a wire-based link, to an output of the projector 2 which is configured to deliver the synchronization signal. This device 3 will be described in greater detail with reference to FIG. 2. This device 3 is disposed between the objective 21 and the screen 4, so that the beam 22 passes through it.

The spectacles 5 are passive stereoscopic spectacles. These spectacles 5 comprise two glasses 51 and 52 intended to be placed in front of, respectively left and right, eyes of a viewer so as to observe the stereoscopic images projected onto the screen 4. The glasses 51 and 52 each comprise a transmissive polarizing filter corresponding respectively to the polarization state predefined for the corresponding sub-sequence of images. Thus, the glasses 51 and 52 are here suitable for allowing through only the light exhibiting a linear polarization, respectively, P and S.

In this description, the terms "upstream" and "downstream" are defined with respect to the direction of propagation of the light emitted by the projector 2, from the objective 21 to the screen 4.

Figure 2:
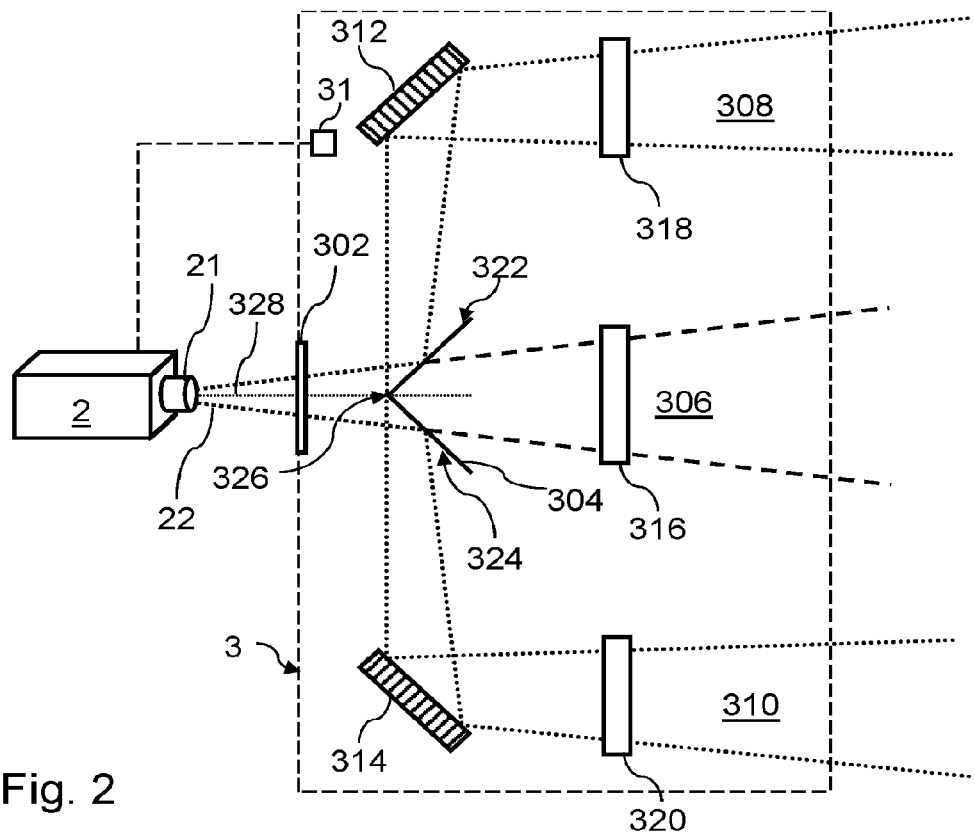
FIG. 2 is a schematic side view of a first embodiment of an optical polarization device of the system of FIG. 1.

FIG. 2 represents in greater detail an exemplary embodiment of the device 3. FIG. 5 schematically illustrates the beams projected on the screen 4. This device 3 comprises, from upstream to downstream:
an optical input 302, configured to allow through the beam 22 produced by the projector 2 when this device 3 is placed downstream of the projector 2. The optical input 302 is normal to the trajectory 328 desired for the beam 22;
an optical element 304, able to decompose the beam 22 into:
a transmitted light beam 306, exhibiting a P optical polarization, and
two reflected light beams 308 and 310, each exhibiting an S optical polarization.
two optical reflectors 312 and 314, configured to modify, respectively, the trajectory of the beams 308 and 310 so that these beams 308 and 310 are projected onto the screen 4 to form, with the beam 306, a stereoscopic image.
three optical-polarization modulators 316, 318 and 320, configured to switch, respectively, the polarization of the beams 306, 308 and 310 between the P and S states, in response to a control signal emitted by the circuit 31. To simplify FIG. 2, the connections between the circuit 31 and each of the modulators 316, 318 and 320 are not represented.

The element 304 is in particular able to split this beam 22 in such a way that the two beams 308 and 310 each correspond to complementary parts of the image produced by the projector 2. Thus, the simultaneous projection on the screen 4 of these beams 308 and 310 leads to the formation of a complete image. Here, these beams 308 and 310 correspond, respectively, to an upper and lower half of the stereoscopic image.

The element 304 comprises two plates 322, 324 to carry out splitting and beam polarization. The plates 322 and 324 are joined together by a join 326. In this description, the term "splitter-polarizer plate" designates in a generic manner an optical beam splitter-polarizer.

In this example, these two plates 322, 324 are juxtaposed so as to exhibit a chevron or "V" shape. These plates 322, 324 are in contact with one another only along one of their edges; the join 326 is then a ridge of essentially rectilinear shape. This join 326 is placed on the trajectory of the beam 328, perpendicularly to this trajectory 328. Here, this join 326 is oriented in a horizontal direction. The join 326 here forms the extremity of the element 304 the closest to the optical input 302.

The angle between the plates 322, 324 is equal to 90°, to within 10% or 5% or 3%. Advantageously, these plates 322, 324 are disposed symmetrically with respect to a plane of symmetry containing the join 326 and the trajectory 328 (or the normal to the optical input 302).

Advantageously, the device 3 is disposed with respect to the projector 2 in such a way that the distance between the objective 21 and the join 326 is less than or equal to 100 mm, preferably less than or equal to 50 mm, preferably less than or equal to 30 mm, preferably less than or equal to 25 mm, and advantageously 20 mm.

In this example, the plates 322, 324 each comprise a thin glass sheet, one face of which is clad with a wire grid optical polarizer. The thickness of such a sheet is less than 5 mm and, preferably, less than or equal to 3 mm or to 0.9 mm. The face of this sheet clad with the polarizer is oriented towards the projector 2. The optical reflection and transmission coefficients, for visible light, of each of the plates 322, 324 are here equal to 50% to +−15%.

Preferably, those edges of these sheets that are placed in contact to form the join 326 exhibit a complementary shape, such as a bevel shape, so as to reduce the thickness of this join 326. Advantageously, the join 326 is formed by juxtaposing flat edges of the plates 322 and 324. These plates 322, 324 are here joined and fastened solidly together with no degree of freedom by means of a bonding agent, such as a UV glue. The thickness of the glue film between the plates 322 and 324 is typically less than or equal to 200 μm. The plates 322 and 324 can also be joined one against the other without gluing.

The reflectors 312, 314 are here identical. Each of these reflectors here comprises a front face mirror, formed of a thin glass plate, covered with a material that is optically reflecting to visible light. This thin glass plate exhibits a thickness of less than or equal to 5 mm and, preferably, of between 1 mm and 3 mm. These mirrors are for example oriented at an angle, with respect to the trajectory 328, of between 40° and 60°, and preferably 45°.

Each of the modulators 316, 318 and 320 is able to switch the optical polarization of a light beam between orthogonal polarization states. The modulators 316, 318 and 320 are for example, in a manner known per se, liquid-crystal polarization modulators.

The optical input 302 is here a window transparent to visible light. This input 302 advantageously comprises a transmissive thermal barrier. This thermal barrier allows the transmission of visible light while limiting the transmission of infrared radiations. The thermal barrier being interposed between the projector 2 and the element 304, the quantity of infrared radiation contained in the beam 21 reaching the element 304 is limited, so as to reduce the heating of this element 304. For example, this barrier comprises a Schott KG type glass filter.

Figure 3:
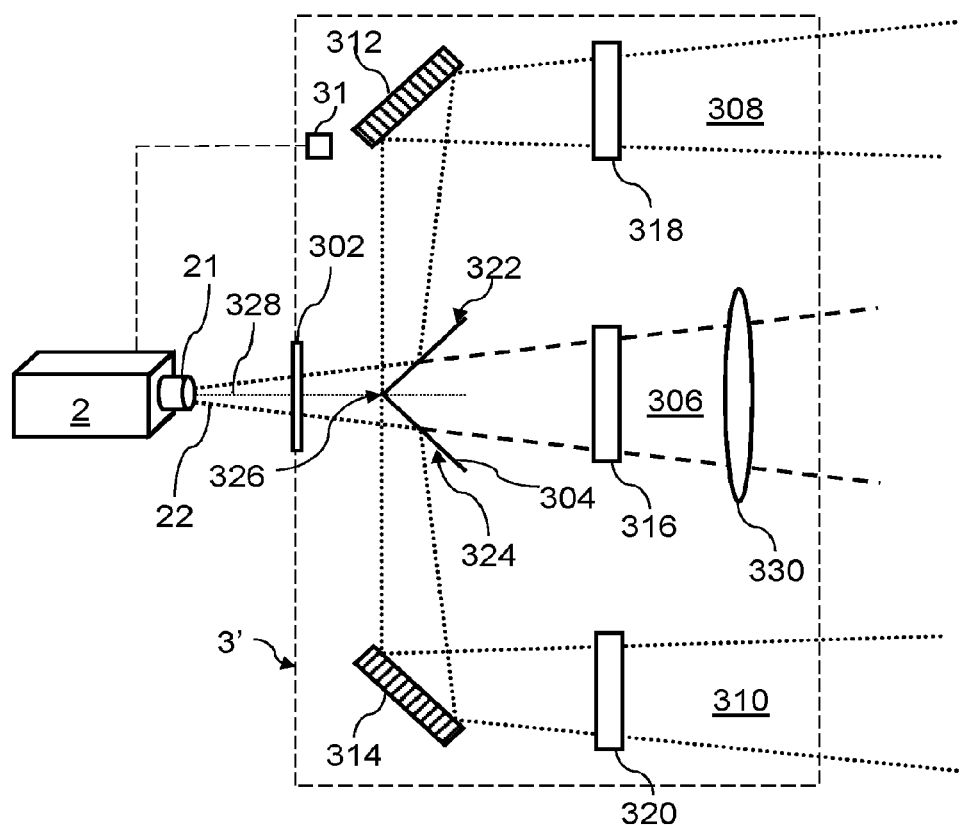
FIG. 3 is a schematic side view of a second embodiment of an optical polarization device of the system of FIG. 1.

FIG. 3 represents a device 3' able to be used instead of the device 3. This device 3' is identical to the device 3, except that it comprises in addition a teleobjective 330, configured to selectively modify the size of the image on the screen 4 arising from the projection of the beam 306, to avoid poor superposition of the beams, such as illustrated in FIG. 5. This teleobjective 330 is placed on the trajectory of the beam 306, and preferably, placed on this trajectory upstream of the modulator 316 to prevent this teleobjective 330 from being able to degrade the polarization of the beam 306 at the output of the modulator 316. Thus, the superposition of this image with the image formed by the projection of the beams 308 and 310 onto the screen is improved, so as to compensate for possible image deformations caused by the difference in length of the respective optical paths of the beams 308 and 310 on the one hand, and 306 on the other hand. In practice, it will be possible to consider that two images are superimposed on the screen 4 if the relative offset on the screen between these two images is less than or equal to three times the length of a pixel.

For example, the teleobjective 330 comprises a plurality of optical lenses or groups of lenses assembled to form an afocal system. This system comprises an adjustment element configured to selectively modify the distance between these lenses or groups of lenses, so as to modify the enlargement of the displayed image. For simplicity, this teleobjective 330 is represented in FIG. 2 as a single lens.

Figure 4:
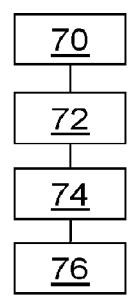
FIG. 4 is a flowchart of a method of displaying stereoscopic images according to one embodiment of the invention.

An example of the operation of the device 3 will now be described, with reference to the flowchart of FIG. 4 and with the aid of FIGS. 1 and 2.

During a step 70, the light beam 22 containing the alternation of the two sub-sequences of stereoscopic images is produced by the projector 2 and is projected through the objective 21 towards the device 3.

Next, during a step 72, the beam 22 is split by the element 304 into:
 the beam 306, which propagates along the trajectory 328 and exhibits the P polarization, and
 the beams 308 and 310, which each propagate in opposite directions, in directions distinct from the trajectory 328, and which exhibit the S polarization. The beams 308 and 310 correspond respectively to two complementary parts of the images produced by the projector 2. Here, these beams correspond respectively to the upper and lower halves of these images.

These beams 308 and 310 are deviated, respectively, by the reflectors 312 and 314 so as to be able to be projected onto the screen 4 so as to reconstruct the entire image on the basis of the two image parts corresponding respectively to these beams 308 and 310, and that this image is superimposed on the image formed by the projection of the beam 306.

Next, during a step 74, the optical polarizations of one or the other of the beam 306 or of the beams 308 and 310 are selectively modified, in such a way that these beams 306, 308 and 310 all exhibit one and the same optical polarization.

For example, when the projector emits an image intended for the left eye, the image displayed on the screen 4 must exhibit a P polarization. The circuit 31 then orders the modulators 318 and 320 to switch the polarization of the beams 308 and 310 from the S state to the P state. The polarization of the beam 306 remains unchanged, since the beam 306 already exhibits the P polarization when it exits the element 304. Next, when the projector 2 emits an image intended for the right eye, the image displayed on the screen 4 must here exhibit the S polarization. The circuit 31 then orders the modulator 316 to switch the polarization of the beam 306 from the P state to the S state. The polarization of the beams 308 and 310 remains unchanged, since these beams already exhibit the S polarization when they exit the element 304.

Thus, since the optical polarization does not need to be modified for all the light beams which form the image, the loss of brightness of the image due to the application and the modulation of the optical polarization is reduced.

Finally, during a step 76, the beams 306, 308 and 310 are projected onto the screen 4 to display the stereoscopic image.

Numerous other embodiments are possible.

The element 304 can be disposed differently. For example, the join 326 can be oriented in another direction in space, while remaining perpendicular to the trajectory 328. For example, this join 326 is oriented vertically. The relative position of the reflectors 312, 314 as well as of the modulators 318, 320 is then adapted accordingly.

The element 304 can comprise more than two plates 322, 324. For example, this element 304 is formed of four identical plates, joined together so as to form a pyramid, whose vertex common to the four plates is placed on the trajectory 328. The beam 22 is then split into a transmitted beam and into four reflected beams. These four reflected beams each correspond to complementary parts of the image. The device 3 then comprises four reflectors and four polarization modulators, configured to play the same role in relation to the four reflected beams as the reflectors 312, 314 and the modulators 318, 320 play in relation to the beams 308 and 310.

The transmissive thermal barrier of the optical input 302 can be omitted.

The polarization modulators 318 and/or 320 can also be placed between the element 304 and the reflectors, respectively, 312 and 314.

The plates 322 and/or 324 can be made differently. For example, as a variant, the grid is replaced with a stack of thin layers of a dielectric material. The plate can also be a polarizer-splitter cube (or "beam splitter cube"), such as a MacNeill prism. Everything that has been described with reference to the plates 312, 314 applies to such a cube and, in particular, to the interface between the two prisms forming each of these cubes. The element 304 is then made by joining two such cubes together, for example by means of glue or mechanical fixing. This cube can also be a Rochon, Sernamont, Wollaston, or Glan-Thompson prism. In these cases, the device 3 is adapted accordingly (such as the relative position, the orientation of the reflectors 312, 314 or the control of the polarization modulators 316, 318, 320) to take account in particular of the differences in direction and/or in the state of polarization of the beams 306, 308, 310.

The teleobjective 330 can comprise a liquid lens, thus allowing easy adjustment while reducing the bulkiness of the device 3. As a variant, the teleobjective 330 is placed upstream of the modulator 316, between this modulator 306 and the element 304.

The optical polarization associated with each of the two sub-sequences of images can be different. For example, this polarization can be circular. In this case, quarter-wave plates are added at the output of the modulators 316, 318 and 320 as well as on the glasses 51, 52 of the spectacles 5. These quarter-wave plates are preferably positioned at an angle of 45° with respect to the optical polarization axis of the modulators 316, 318, 320. The P and S polarization states can be replaced with any two orthogonal polarization states.

The wire link between the circuit 31 and the projector 2 can be replaced with a wireless link, such as a link by infrared radiation or by radio.

The devices 3 or 3' can comprise optical polarization rotators, disposed on the trajectory of the beams, respectively, 308 and 310, in such a way that the beams 308, 310 and the beam 306 exhibit one and the same polarization state at the input of the modulators 316, 318 and 320. In this case, the circuit 31 is adapted so that the modulators 316, 318 and 320 apply one and the same polarization modulation during step 64. Thus, the modulation of the polarization of the beams 308, 310 by the modulators 318 and 320 is made easy, in particular in the case where these modulators 318 and 320 are liquid-crystal polarization modulators. In this example, these rotators convert the S polarization of the beams 308, 310 into a P polarization. Preferably, these first and second rotators are placed between the element 304 and, respectively, the reflectors 312 and 314.

The teleobjective 330 can be omitted. In this case, an improvement of the superposition of the images on the screen 4, to avoid the effect shown in FIG. 5, can also be made by replacing the reflectors 312 and 314 with reflectors able to modify the trajectory of the beams 308 and 310 in response to a control signal, such as deformable reflectors.

A deformable reflector such as this comprises for example a front face mirror made of thin glass and anchored on its rear face to the device 3 at four fixing points. In the centre and at the respective middles of the edges of this rear face are glued pads, this mirror being deformable by anamorphosis by means of adjustment screws joined to these pads.

FIG. 6 is a side view in perspective of a first variant of a mirror 6 that can be used instead of a mirror 312 and/or 314 such as were described previously. FIG. 7 is an end-on view of this mirror 6. The mirror 6 comprises a support 61 including for example a rigid chassis. The mirror 6 also comprises a deformable reflecting panel 62, for example a thin glass panel exhibiting a reflecting face. The mirror 6 also comprises a deformation actuator 63. Here the actuator 63 passes through the support 61 so as to be driven by a mechanism, not illustrated. Here the reflecting panel 62 is held between pointlike bearings fixed to the support 61. Four bearing points 641, 642, 643 and 644 are in contact with one face of the reflecting panel 62 and fastened to the support 61, four other optional bearing points preferably being disposed opposite the bearing points 641, 642, 643 and 644, and in contact with the other face of the reflecting panel 62. The pointlike bearing points of a face are advantageously positioned at the vertex of an isosceles trapezium.

FIG. 8 is a side view in perspective of a second variant of a mirror 6 that can be used instead of a mirror 312 and/or 314 such as were described previously. FIG. 8 is a surface view of this mirror 6. The mirror 6 comprises a support 61, a reflecting panel 62 and a deformation actuator 63 that are identical to those of the first variant. Here the reflecting panel 62 is held between linear bearings fixed to the support 61. A bearing 645 and a bearing 646 are in linear contact with one face of the reflecting panel 62 and fastened to the support 61, two other optional linear bearings preferably being disposed opposite these bearings 645 and 646 and being in contact with the other face of the reflecting panel 62. The contact lines of the bearings form the non-parallel sides of an isosceles trapezium.

In the variants of FIGS. 6 to 9:
the angle of opening $\alpha$ of the trapezium is advantageously between 5° and 75°, and preferably between 20 and 25°, for example a value of 22.5°.
the deformation actuator 63 loads the reflecting panel 62 either in compression, or in tension, so as to render the reflecting face selectively concave or convex, with an appropriate amplitude. The deformation actuator 63 will be for example displaced to obtain an adjustment in which the various reflected and transmitted beams are superimposed on the screen 4. The deformation actuator 63 loads the reflecting panel 62 at the level of the perpendicular bisector of the bases of the trapezium.
the deformation actuator 63 will be able for example to be fixed (for example by gluing) in a pointlike manner on the perpendicular bisector of the bases of the trapezium. The fixing of the deformation actuator 63 will be able for example to be situated at a third of the distance between the small base and the large base of the trapezium, starting from the small base. Ideally the deformation actuator 63 will be able to be situated $x=l*(1-1/\sqrt{2})$ of the distance between the small base and the large base, starting from the small base, where l is the width of the reflecting panel.

FIGS. 10 and 11 are respectively underside and sectional side views of a reflecting panel 62 associated with an advantageous example of a deformation actuator 63. Here the deformation actuator comprises a shaft 633 extending in a manner perpendicular to the panel 62. The bar 633 is fixed to an elongate rigid element 632 (the element 632 may also be flexible) disposed on the perpendicular bisector of the trapezium defined by the linear or pointlike contacts. The bar 633 advantageously extends at least over the height of this trapezium and is secured to the element 632. The rigid element 63 is fixed on the rear face of the reflecting panel 62 by way of a glue film 631, so as to distribute the loads exerted on this reflecting panel 62 and thus to deform it in a homogeneous manner. Here the glue film 631 forms a flexible element (the glue film 631 may also be rigid) and exhibits for example a trapezium shape with bases whose perpendicular bisector coincides with the perpendicular bisector of the trapezium of the contact points or lines (illustrated dashed). The element 632 may for example exhibit a part of trapezium shape superimposed on the shape of the glue film 632. The element 632 can comprise a part having an elongate extrusion shape, and to which the bar 633 is fixed. The film 631 advantageously extends at least over the entire height of the trapezium of the contact points or lines. The small base of the trapezium of the contact lines or points is opposite to the small base of the trapezium of the film 631. The shaft 633 is advantageously positioned substantially at a third of the height of the trapezium formed by the film 631, starting from the large base. The angle of opening θ of the trapezium formed by the film 631 is advantageously between 5° and 45°, and preferably between 10 and 20°, for example a value of 15°. The mirrors 6 detailed are the subject of an entirely separate invention.

Figure 12:
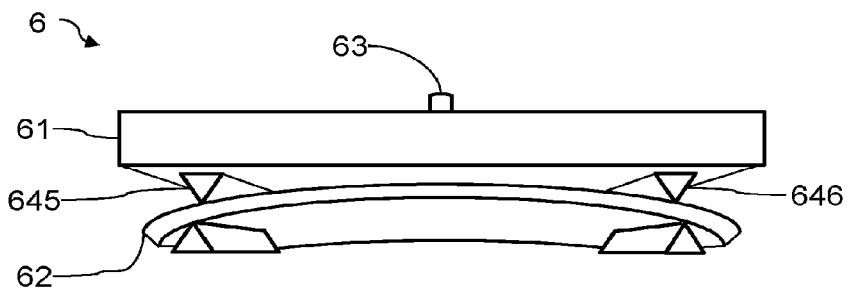
FIGS. 12 and 13 are side views of the mirror of FIGS. 8 and 9 in two deformation configurations.
Figure 13:
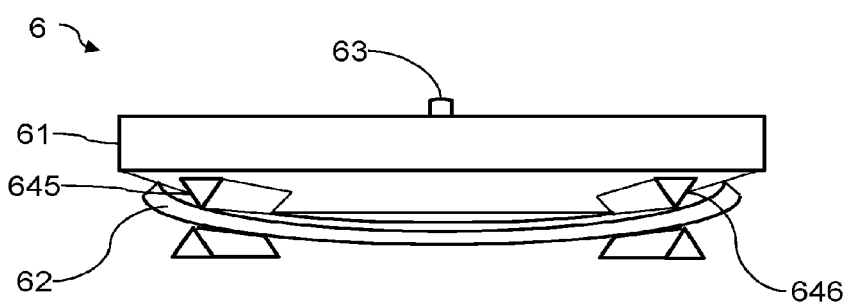

FIGS. 12 and 13 illustrate two examples of configurations of deformation of the mirror 6 of the variants of FIGS. 8 and 9. In the configuration of FIG. 12, the reflecting face of the panel 62 is concave. In the configuration of FIG. 13, the reflecting face of the panel 62 is convex.

Figure 14:
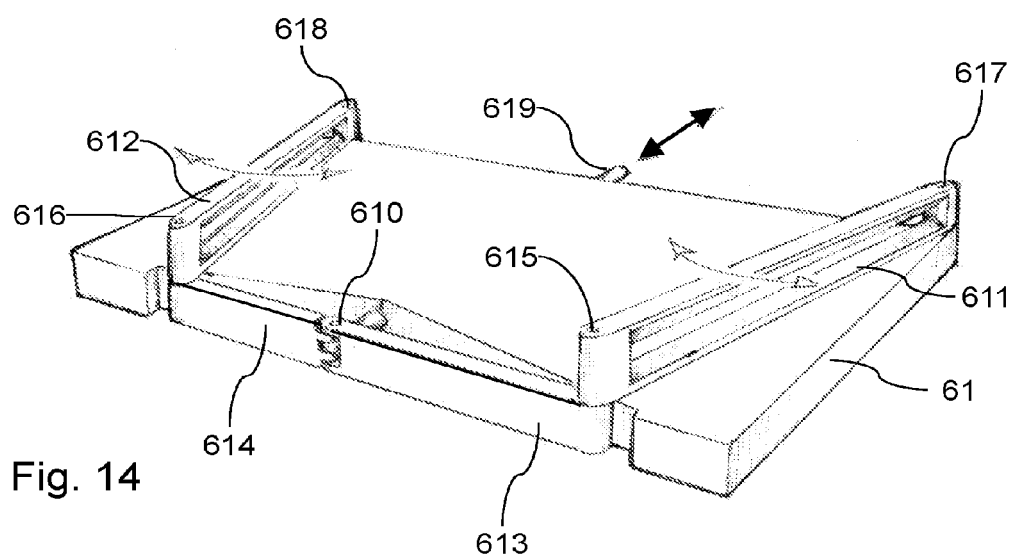
FIG. 14 is a perspective view of a support making it possible to modify the bearings of a mirror.

FIG. 14 is a perspective view of a variant support 61 making it possible to modify the geometry of the trapezium of the points or lines of contact with the reflecting element 62. In this example, the support 61 comprises a substantially plane frame. Two arms 611 and 612 are mounted pivoting with respect to the frame, about respective axes 617 and 618 perpendicular to the plane of this frame. The axes 617 and 618 are disposed at the level of a first end of the arms 611 and 612. The arms 611 and 612 are intended to receive points or lines of contact with the reflecting panel 62, at the level of their upper surface. The arms 611 and 612 thus define the non-parallel sides of the trapezium of the contact points or lines. Linkages 613 and 614 are mounted pivoting about respective axes 615 and 616 by a first end. These axes 615 and 616 are perpendicular to the plane of the frame and disposed at the level of a second end of the arms 611 and 612 respectively. The linkages 613 and 614 are mounted pivoting with respect to one another at the level of a second end, about an axis 610 perpendicular to the plane of the frame. The axis 610 is selectively loaded by an actuator 619. When the axes 610, 615 and 616 are aligned, the distance between the axes 615 and 616 is a maximum, so that the angle of opening α of the trapezium is a minimum. When the actuator 619 causes the axis 610 to deviate from alignment with the axes 615 and 616, the linkages 613 and 614 cause the axes 615 and 616 to approach one another. The angle of opening α of the trapezium is then increased.

The invention claimed is:

1. An optical polarization device for a stereoscopic image projector, comprising:
    a polarizer optical element configured to decompose an incident light beam emitted by a stereoscopic image projector, into:
        a transmitted light beam exhibiting a first optical polarization state, and
        first and second reflected light beams exhibiting a second optical polarization state distinct from the first optical polarization state;
    the polarizer optical element comprising two beam splitter-polarizer plates, joined together, a join between the plates being placed on a trajectory of the incident beam;
    first and second optical reflectors configured to modify, respectively, the trajectory of the first and second reflected light beams such that the reflected and transmitted light beams are projected to form one and same stereoscopic image;
    first, second, and third polarization modulators configured to selectively switch the optical polarization, respectively, of the transmitted light beam, of the first and of the second reflected light beams, between the first and second optical polarization states in response to a control signal;
    a control circuit for the polarization modulators, programmed to deliver a control signal controlling the switching of the polarization, at a given instant, of the transmitted light beam or of each of the first and second reflected light beams, such that the reflected and transmitted light beams all exhibit one and same optical polarization state,
    wherein the first optical reflector comprises a reflecting panel, bearing on at least four points, the four points being disposed at the vertex of a trapezium, the device further comprising at least one actuator loading the reflecting panel in a direction passing through the trapezium to deform the reflecting panel out of the plane of the trapezium,
    wherein the actuator is fixed to the reflecting panel at least over an entire height of the trapezium, and
    wherein the actuator comprises a flexible element fixed to the reflecting panel, the flexible element being glued to the reflecting panel on a surface in shape of a trapezium whose base is opposite to the base of the trapezium of points for holding in position, the actuator loading the reflecting panel by the flexible element.

2. A device according to claim 1, wherein the polarizer optical element comprises at most two plates, the two plates being joined together to exhibit a chevron shape, the join between the two plates forming a ridge, placed on the trajectory of the incident beam perpendicularly to the trajectory.

3. A device according to claim 2, wherein the angle between the two plates is equal to 90°, to within 10%.

4. A device according to claim 1, wherein the two plates are symmetric with respect to a plane of symmetry passing through the join and through the trajectory of the incident beam.

5. A device according to claim 1, wherein distance, measured along the trajectory of the incident beam, between the output of the stereoscopic image projector and the join between the plates, is less than or equal to 50 mm.

6. A device according to claim 1, further comprising a teleobjective placed on the optical path of the transmitted beam, the teleobjective configured to magnify an image formed by the projection of the transmitted beam.

7. A device according to claim 1, wherein each of the first and second optical reflectors is configured to be deformed in response to a control signal to modify the trajectory and/or size of the, respectively, first and second reflected light beams.

8. A device according to claim 1, wherein the trapezium comprises at least one angle between 5° and 75°.

9. A device according to claim 1, wherein a perpendicular bisector of bases of the trapezium is included in one and same plane with the transmitted light beam.

10. A device according to claim 1, wherein second optical reflector comprise a reflecting panel.

11. A device according to claim 1, wherein the first and second optical polarizations are, respectively, of P and S type.

12. A device according to claim 1, wherein:
the first and second optical polarization states are mutually crossed circular polarization states;
the device further comprises a quarter-wave plate placed at an output of each of the polarization modulators, each of the quarter-wave plates being oriented at 45° to the polarization axis of the light beams exiting the polarization modulators.

13. A device according to claim 1, wherein a transmissive thermal barrier is disposed on the trajectory of the light beam, upstream of the polarizer optical element.

14. A device according to claim 1, further comprising first and second polarization rotators disposed on the trajectory of the, respectively, first and second reflected light beams, such that the reflected beams and the transmitted beam exhibit one and same polarization state at an input of the polarization modulators.

15. A device according to claim 1, comprising two bearing members, disposed on opposing sides of the trapezium.

* * * * *